United States Patent [19]

Southwick et al.

[11] Patent Number: 5,210,147
[45] Date of Patent: May 11, 1993

[54] 100% TRIBLOCK HYDROGENATED STYRENE-ISOPRENE-STYRENE BLOCK COPOLYMER ADHESIVE COMPOSITION

[75] Inventors: Jeffrey G. Southwick; Earle E. Ewins, Jr.; David J. St. Clair, all of Houston, Tex.

[73] Assignee: Shell Oil Company, Houston, Tex.

[21] Appl. No.: 703,068

[22] Filed: May 20, 1991

[51] Int. Cl.$^5$ .................. C08F 297/04; C08L 53/02
[52] U.S. Cl. ..................... 525/314; 525/95; 525/98
[58] Field of Search .................. 525/314, 95

[56]  References Cited

U.S. PATENT DOCUMENTS

| 3,231,635 | 1/1966 | Holden et al. | 525/271 |
| 3,239,478 | 3/1966 | Harlan, Jr. | 260/27 |
| 3,333,024 | 7/1967 | Haefele et al. | 525/314 |
| 3,614,836 | 10/1971 | Snyder et al. | 36/84 |
| 3,753,936 | 3/1973 | Marrs | 260/27 |
| 3,917,607 | 11/1975 | Crossland et al. | 260/28.5 |
| 3,954,692 | 5/1976 | Downey | 524/485 |
| 4,699,938 | 10/1987 | Minamizaki et al. | 525/314 |
| 4,822,653 | 4/1989 | Kauffman et al. | 428/34.2 |
| 4,833,193 | 5/1989 | Sieverding | 524/486 |
| 4,868,057 | 9/1989 | Himes | 428/412 |
| 5,118,762 | 6/1992 | Chin | 525/314 |

FOREIGN PATENT DOCUMENTS 0330088 2/1989 European Pat. Off. .
1213380 2/1988 Japan .

OTHER PUBLICATIONS

Jagisch, Frank C. and Trancrede, Jean M. "New Styrene Block Copolymers for Tape and Label Use", PTSC Technical Seminar Proceedings, May 1990.

Primary Examiner—James J. Seidleck
Assistant Examiner—Mark L. Warzel
Attorney, Agent, or Firm—Donald F. Haas

[57]  ABSTRACT

A predominantly linear 100% triblock sequentially polymerized hydrogenated styrene-isoprene-styrene block copolymer composition comprised of linear polymeric blocks for use in adhesives, modified thermoplastic compositions and mechanical goods.

3 Claims, No Drawings

100% TRIBLOCK HYDROGENATED STYRENE-ISOPRENE-STYRENE BLOCK COPOLYMER ADHESIVE COMPOSITION

BACKGROUND OF THE INVENTION

This invention relates to a novel block copolymer composition for use in hot melt adhesives. More particularly, it relates to predominantly linear 100% triblock hydrogenated styrene-isoprene-styrene block copolymer compositions comprised of linear polymeric blocks and adhesives made using such compositions.

It is known that a block copolymer can be obtained by an anionic copolymerization of a conjugated diene compound and an alkenyl arene compound by using an organic alkali metal initiator. Block copolymers have been produced which comprise primarily those having a general structure A—B and A—B—A wherein the polymer blocks A comprise thermoplastic polymer blocks of alkenyl arenes such as polystyrene, while block B is a polymer block of a conjugated diene such as polyisoprene. The proportion of the thermoplastic blocks to the elastomeric polymer block and the relative molecular weights of each of these blocks is balanced to obtain a rubber having unique performance characteristics. When the content of the alkenyl arene is small, the produced block copolymer is a so-called thermoplastic rubber. In such a rubber, the blocks A are thermodynamically incompatible with the blocks B resulting in a rubber consisting of two phases-a continuous elastomeric phase (blocks B) and a basically discontinuous hard, glass-like plastic phase (blocks A) called domains. Since the A—B—A block copolymers have two A blocks separated by a B block, domain formation results in effectively locking the B blocks and their inherent entanglements in place by the A blocks and forming a network structure.

These domains act as physical crosslinks anchoring the ends of many block copolymer chains. Such a phenomena allows the A—B—A rubber to behave like a conventionally vulcanized rubber in the unvulcanized state and is applicable for various uses. For example, these network forming polymers are applicable for uses such as in adhesive formulations; as moldings of shoe soles, etc.; impact modifier for polystyrene resins and engineering thermoplastics; modification of asphalt; etc.

In the prior art, such as that exemplified by U.S. Pat. Nos. 3,595,941 and 3,468,972, the disclosures of which are herein incorporated by reference, the effort was always made to select the particular coupling agent or reaction conditions that resulted in the highest coupling efficiency. High coupling efficiency is desired herein in order to produce strong adhesive compositions. However, almost all commercial polymers are substantially less than 100% coupled, i.e. they contain a substantial amount of diblock. Coupling efficiency is defined as the mass of molecules of coupled polymer divided by the mass of molecules of coupled polymer plus the mass of molecules of uncoupled polymer. Thus, when producing an SIS linear polymer, the coupling efficiency is shown by the following relationship:

$$\frac{\text{Mass of Molecules of } SIS}{\text{Mass of molecules of } SIS \text{ plus } SI}$$

Coupling efficiency can be determined theoretically from the stoichiometric quantity of coupling agent required for complete coupling or coupling efficiency can be determined by an analytical method such as gel permeation chromatography. Typical prior art coupling efficiency is from about 80% to almost 100%. In U.S. Pat. No. 4,096,203, coupling efficiency is controlled from about 20% to about 80%, preferably about 30% to about 70%. Prior art also disclosed how to blend polymers from processes of differing coupling efficiency. For example, if a 60% efficiency is desired, then polymers from processes having an 80% efficiency and a 40% efficiency may be blended together.

SUMMARY OF THE INVENTION

The present invention relates to predominantly linear 100% triblock, sequentially polymerized hydrogenated styrene-isoprene-styrene (S—I—S) block copolymer compositions comprised of linear polymeric blocks. These compositions can be used in adhesives and many other end uses.

DETAILED DESCRIPTION OF THE INVENTION

As is well known, polymers containing both aromatic and ethylenic unsaturation can be prepared by copolymerizing one or more polyolefins, particularly a diolefin, in this case isoprene, with one or more alkenyl aromatic hydrocarbon monomers, in this case styrene. The copolymers may, of course, be random, tapered, block or a combination of these, in this case block. The blocks in the copolymers of this invention are linear.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as predominantly linear S—I—S block copolymers are frequently prepared in solution using anionic polymerization techniques. In general, when solution anionic techniques are used, these S—I—S block copolymers are prepared by contacting the monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

RLi$_n$ wherein:
R is an aliphatic, cycloaliphatic, aromatic or alkyl-substituted aromatic hydrocarbon radical having from 1 to about 20 carbon atoms; and n is an integer of 1 to 4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, tetrahydrofuran and the like.

The concentration of the initiator can be regulated to control the molecular weight of the overall composition and of the polystyrene blocks. Generally, the initiator concentration is in the range of about 0.25 to about 50 millimoles per 100 grams of monomer. The ratio of the initiator to the monomer determines the block size, i.e. the higher the ratio of initiator to monomer the smaller the molecular weight of the block.

Methods of controlling the molecular weights of the blocks and the overall polymer are quite well known. For instance, such are disclosed in U.S. Pat. No. 3,149,182, which states that the amount of monomer can be kept constant and different molecular weights can be achieved by changing the amount of catalyst or the amount of catalyst can be kept constant and different molecular weights can be achieved by varying the amount of the monomer, and in U.S. Pat. No. 3,231,635, the disclosures of which are herein incorporated by reference, and many others. A typical block copolymer composition within the scope of the present invention, having a polystyrene block molecular weight of around 6,000, a polystyrene content of 18% by weight and an overall molecular weight of 60,000 was prepared by sequentially introducing styrene, isoprene, and styrene into the reactor, with sec-butyl lithium as initiator. First, styrene was polymerized at a monomer to initiator molar ratio of 6,000 to 1 and then isoprene was polymerized at a monomer to initiator molar ratio of 48,000 to 1 and finally styrene again under the same conditions as before.

Following the sequential polymerization, the product is terminated such as by the addition of terminators, e.g. water, alcohol, hydrogen or other reagents, for the purpose of removing the lithium radical forming the nucleus for the condensed polymer product. The product is then recovered such as by coagulation utilizing hot water or steam or both.

The hydrogenation of these polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952 and U.S. Pat. No. Re. 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation.

It is essential to the performance of the present invention that the S—I—S block copolymers used herein be 100% triblock i.e. they must contain essentially no diblock. We have found that using a 100% triblock hydrogenated SIS block copolymer (otherwise known as an SEPS polymer) allows one to achieve greater holding power and higher shear adhesion failure temperature (SAFT) than when polymers with a substantial amount of diblock are used in an adhesive formulation. Additionally, we have found that SEPS block copolymers, whether they are 100% triblock or not, have better high temperature performance than SEBS (hydrogenated styrene-butadiene-styrene) block copolymers of equivalent styrene content and molecular weight. This is indicated by the fact that they have higher SAFT values.

It is necessary to add an adhesion promoting or tackifying resin that is compatible with the elastomeric hydrogenated isoprene block. A common tackifying resin is a diene-olefin copolymer of piperylene and 2-methyl-2-butene having a softening point of about 95° C. This resin is available commercially under the tradename Wingtack 95 and is prepared by the cationic polymerization of 60% piperylene, 10% isoprene, 5% cyclopentadiene, 15% 2-methyl-2-butene and about 10% dimer, as taught in U.S. Pat. No. 3,577,398 incorporated by reference. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpene-phenol resins and polymerized mixed olefins. To obtain good thermo-oxidative and color stability, it is preferred that the tackifying resin be a saturated resin, e.g., a hydrogenated dicyclopentadiene resin such as Escorez ® 5000 series resin made by Exxon or a hydrogenated polystyrene or polyalphamethylstyrene resin such as Regalrez ® resin made by Hercules.

The amount of adhesion promoting resin employed varies from about 20 to about 400 parts by weight per hundred parts rubber (phr), preferably between about 100 to about 350 phr.

The selection of the particular tackifying agent is, in large part, dependent upon the specific block copolymer employed in the respective adhesive composition. In the manufacture of disposable articles such as diapers, sanitary napkins and bed pads, there is the additional consideration of having a substantially white or clear adhesive composition.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo ® 6056 oil made by Arco. The amounts of rubber compounding oil employed in the invention composition can vary from about 0 to about 100 phr, and preferably between about 0 to about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Additional stabilizers known in the art may also be incorporated into the adhesive composition. These may be for protection during the life of the disposable article against, for example, oxygen, ozone and ultraviolet radiation. However, these additional stabilizers should be compatible with the essential stabilizers mentioned herein-above and their intended function as taught herein.

The adhesive compositions of the present invention are typically prepared by blending the components at an elevated temperature, preferably between about 130° C. and about 200° C., until a homogeneous blend is obtained, usually less than three (3) hours. Various method of blending are known to the art and any method that produces a homogeneous blend is satisfactory.

The resultant adhesives may then preferably be used in a wide variety of product assembly applications. Examples include tapes, labels, diapers, sanitary napkins and decals.

The 100% triblock SEPS block copolymers of the present invention may also be used in end uses other than adhesives. Examples include the modification of polycarbonate, polystyrene, polyphenylene ether, etc. thermoplastics. The important features for elastomeric materials in mechanical goods product applications are their low hardness, flexibility, low hysterisis and high mechanical strengths. Based on the structure-property relationship, it is desirable to have elastomeric polymers with flexible chain backbone in order to formulate soft and flexible elastomeric product. In styrenic based thermoplastic elastomer technology, it is known that the flexibility of the formulated products depends on a) the polystyrene content; b) the proportion of carbon atoms in the main chain of the elastomer segment; c) the molecular weight of the elastomer between chain entanglements in the elastomer chain and d) the crystallinity of the elastomer chain segment.

Unlike the hydrogenation of polybutadiene polymer, the hydrogenation of polyisoprene produces only short sequences of methylene units, which will not crystallize. Thus one would expect the S—EP—S block copolymers to be softer than the S—EB—S block copolymers which can be partially crystallized. The elasticity and hysterisis behavior of S—EP—S polymers will also be superior to that of their S—EP—S counterparts because of the lack of crystallinity in the EP rubber chain. Furthermore, the flexibility of S—EP—S based thermoplastic elastomers could be enhanced as the rubber chain segment is plasticized with oil. The inherent characteristics of the hydrogenated polyisoprene polymer should enable one to formulate styrenic thermoplastic elastomer compositions based on S—EP—S polymers with such properties as superior flexibility and elasticity.

In the following examples, the percent triblock was determined by Gel Permeation Chromatography. The melt viscosity was measured in centipoise (cps) by using a Brookfield Thermocell viscometer at 350° F. The SAFT was measured by 1"×1" Mylar to Mylar lap joint with a 1 kg weight. SAFT measures the temperature at which the lap shear assembly fails under load. The molecular weights were determined by gel permeation chromatography as styrene equivalent molecular weight. The polystyrene content was determined by nuclear magnetic resonance spectroscopy. Rolling Ball Tack is the distance a steel ball rolls on the adhesive film with a standard initial velocity. Small numbers indicate aggressive tack. Holding Power is the time required to pull a standard area (½ in. × ½ in.) of tape from a standard test surface (steel, Kraft paper) under a standard load, in shear at 2° antipeel (Pressure Sensitive Tape Council Method No. 7).

EXAMPLES

Polymer A is a 100% triblock SEPS linear block copolymer containing 18% by weight styrene and having polystyrene block molecular weights of about 5600. Polymer B is a coupled SEPS block copolymer containing 27% diblock and having a styrene content of 13% and polystyrene block molecular weights of 5800. Polymer C is a coupled SEBS (hydrogenated styrene-butadiene-styrene) block copolymer containing 35% diblock and having a styrene content of 13% by weight and polystyrene block molecular weights of 5300. Polymer A had a stress at break of 4000 psi while that of Polymer C was only 3400 psi. These polymers were used to make adhesive formulations containing 29% by weight polymer, 41% by weight REGALREZ® 1078 (Hercules tackifying resin) and 29% REGALREZ® 1018 (Hercules tackifying resin). The adhesive formulations were tested for adhesive strength and the results are shown below.

| Test | Polymer A | Polymer B | Polymer C |
| --- | --- | --- | --- |
| Rolling Ball Tack (cm) | 10.4 | 3.2 | 2.5 |
| Holding Power Steel (min) | 511 | 128 | 200 |
| Holding Power Kraft Paper (min) | 77 | 5 | 38 |
| SAFT (°C.) | 65 | 64 | 55 |
| Adhesive Viscosity (cp) | 7000 | 12,000 | 13,000 |

It is clearly seen that the results of the adhesive strength tests, rolling ball tack, holding power steel and holding power Kraft paper, show that the polymer made according the present invention, Polymer A, has much higher strength than the other two polymers. The SAFT results indicate that both of the SEPS block copolymers have better high temperature performance than the SEBS block copolymer (SAFT 9° and 10° C. higher).

I claim:

1. A linear 100% triblock sequentially polymerized hydrogenated styrene-isoprene-styrene block copolymer containing essentially no diblock and comprised of linear polymeric blocks wherein the styrene content is 18% by weight, the styrene block molecular weight is from 5600 to 6000 and the residual unsaturation content in the polydiene block is less than 20%.

2. An adhesive having a holding power to steel of greater than 500 min and an SAFT of 65° C. or greater comprising the block copolymer of claim 1 and from 20 to 400 parts by weight per 100 parts rubber of a compatible tackifying resin.

3. A thermoplastic polymer composition comprising a thermoplastic polymer and the block copolymer of claim 1.

* * * * *